United States Patent [19]
Geuss et al.

[11] Patent Number: 5,975,637
[45] Date of Patent: Nov. 2, 1999

[54] ADJUSTABLE VEHICLE SEAT

[75] Inventors: Hartwich Geuss, Stuttgart; Werner Reichelt, Esslingen; Helge Schmidt-Spalding, Stuttgart, all of Germany

[73] Assignee: DaimlerChrysler AG, Stuttgart, Germany

[21] Appl. No.: 09/213,237

[22] Filed: Dec. 17, 1998

[30] Foreign Application Priority Data

Dec. 19, 1997 [DE] Germany ............................ 197 56 700

[51] Int. Cl.$^6$ ...................................................... A47C 7/36
[52] U.S. Cl. ...................... 297/391; 297/410; 297/344.1; 297/354.12; 297/216.12; 297/DIG. 3; 297/284.6
[58] Field of Search ............................ 297/216.13, 216.1, 297/216.12, 126.14, 344.1, 344.12, 325, DIG. 3, 452.41, 354.12, 391, 410, 284.6, 284.4, 284.1; 248/429

[56] References Cited

U.S. PATENT DOCUMENTS

| 3,680,912 | 8/1972 | Matsuura ........................ 297/216.12 X |
| 4,222,608 | 9/1980 | Maeda ...................................... 297/410 |
| 4,655,505 | 4/1987 | Kashiwamura et al. .............. 297/284.6 |
| 4,720,146 | 1/1988 | Mawbey et al. . |
| 4,923,250 | 5/1990 | Hattori ..................................... 297/410 |
| 5,330,255 | 7/1994 | Stawicki ................................... 297/391 |
| 5,439,271 | 8/1995 | Ryan ................................... 297/344.1 X |
| 5,458,396 | 10/1995 | Rost ................................. 297/216.13 X |
| 5,782,529 | 7/1998 | Miller, III et al. ................. 297/216.13 |

FOREIGN PATENT DOCUMENTS

| 2152202 | 11/1980 | Germany ........................... 297/216.12 |
| 3141515 | 4/1983 | Germany ................................ 297/410 |
| 37 18 126 A1 | 12/1988 | Germany . |
| 44 09 046 C2 | 9/1995 | Germany . |

Primary Examiner—Milton Nelson, Jr.
Attorney, Agent, or Firm—Evenson, McKeown Edwards & Lenahan P.L.L.C.

[57] ABSTRACT

A vehicle seat includes a seat part displaceable at least in the seat longitudinal direction; a back rest that is held on the seat part; and an adjustable head restraint held on the back rest and having a head cushion. For automatically adapting the head restraint correctly in terms of safety to seat adjustments carried out by a seat user, a medium reservoir of variable volume, communicating with a filling and discharge device, is integrated in the head cushion so that the cushion front face is shifted forwards during an increase in volume and is drawn back again as a result of a reduction in volume. The filling quantity introduced into the medium reservoir or drawn off from the medium reservoir is controlled depending on the seat setting by means of a control unit. The medium reservoir also may include a pressure limiter that allows a controlled outflow of the reservoir when a predetermined pressure value, caused by the impact of the head, is reached.

22 Claims, 3 Drawing Sheets

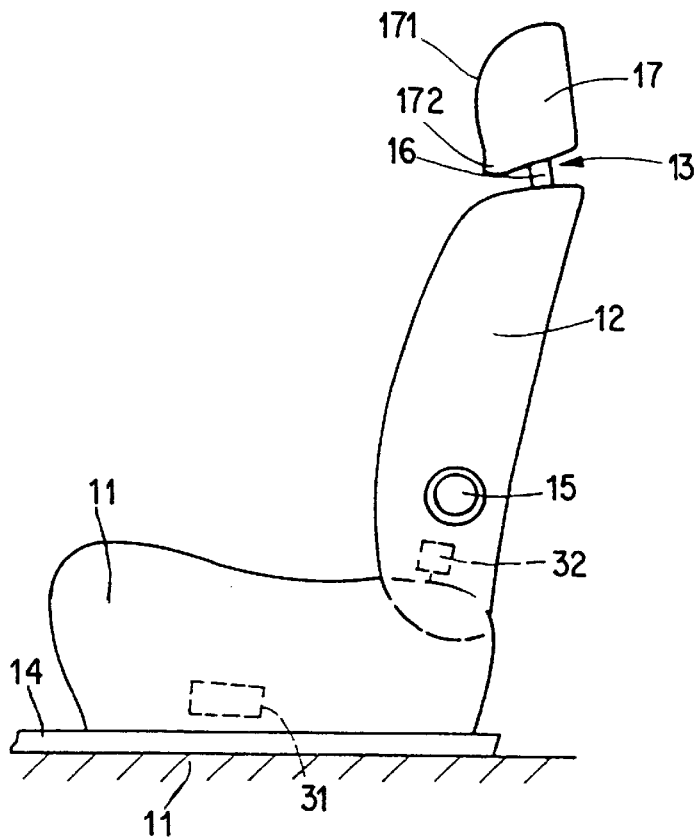
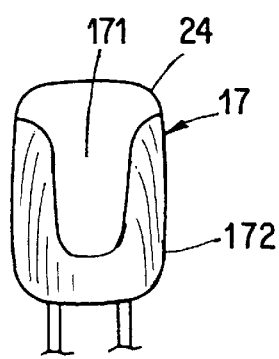
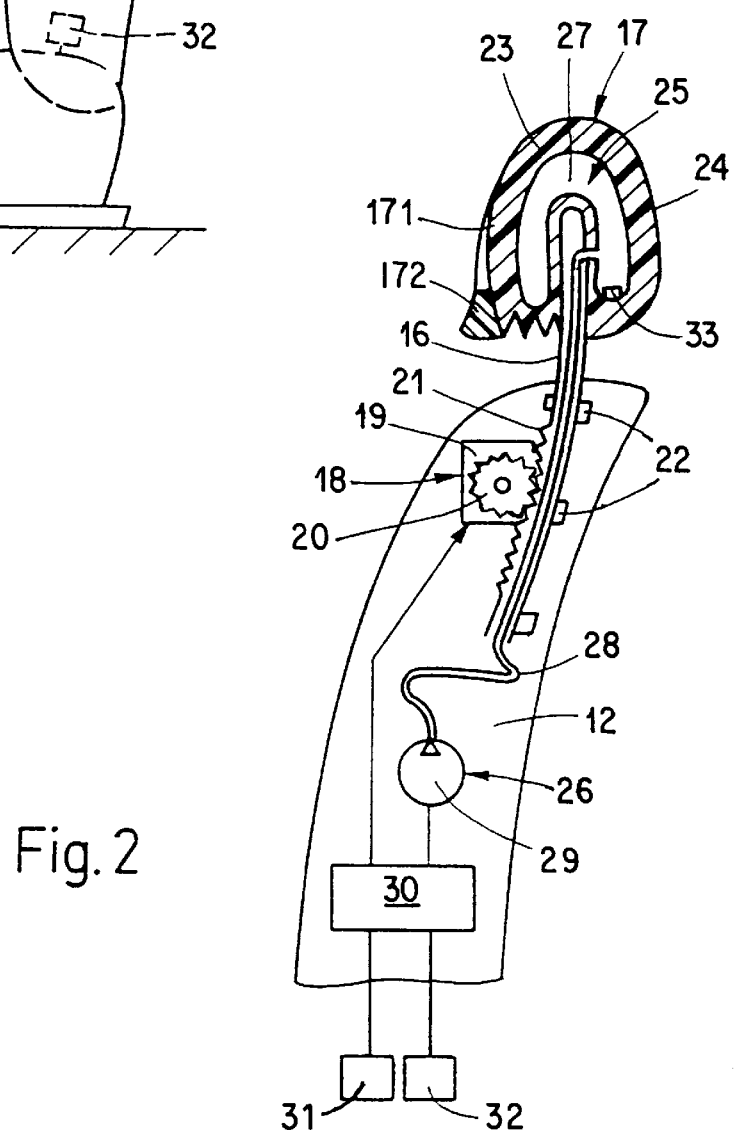
Fig. 1
Fig. 3
Fig. 2

ADJUSTABLE VEHICLE SEAT

BACKGROUND AND SUMMARY OF THE INVENTION

This application claims the priority of German Patent Document No. 197 56 700.2, filed Dec. 19, 1997, the disclosure of which is expressly incorporated by reference herein.

The present invention relates to a vehicle seat capable of being adjusted to adapt the seat position, in particular for motor vehicles.

In a known vehicle seat (DE 37 18 126 A1), the seat-length adjustment is positively coupled to a seat-height adjustment, so that, when the seat height is adjusted, a resulting overall movement of the vehicle seat takes place along an arc of a circle. This is intended to ensure that the driver, after adjusting the seat length for the purpose of setting the desired distance from the vehicle pedal assembly and after a subsequent adjustment of the seat height, does not have to correct the seat-length adjustment again in order to restore the distance from the vehicle pedal assembly, which otherwise changes during seat-height adjustment.

In present-day traffic situations, for adjustable seats, the correct setting of the head restraint after the correct seat position has been found is of great importance from the point of view of safety. The force introduced into the body of the seated person in the event of an accident must be in the right places in order to avoid detriment to health and physical injury. At the same time, the fact must be taken into account that the head and the rest of the body of the seated person are subjected to different acceleration. The force generated in the event of an accident typically acts in the region of the cervical vertebra of the spinal column and, even in minor accidents, easily leads to so-called SVS trauma if the head restraint is set incorrectly.

In a known vehicle seat (DE 44 09 046 C2), therefore, the height and inclination of the head restraint, too, can be adjusted in dependence on parameters of the seat setting, in such a way that the head cushion is always arranged in relation to the back of the seat user's head, which is favourable from a safety point of view. For this purpose, a control unit has a characteristic diagram, in which the values of dependently adjustable components of the vehicle seat, for example the back rest and the head restraint, are stored in relation to at least one vehicle-seat component, for example the seat part, which can be adjusted independently by the seated person. If, for example, the seat part is adjusted longitudinally by the seated person, adjusting devices for setting the back rest inclination and for adjusting the height of the head restraint are activated, depending on the values for this longitudinal seat adjustment which are retrieved from the characteristic diagram.

In a known head restraint (U.S. Pat. No. 4,729,146), an expandable airbag is arranged in the head cushion and is connected to a compressed-air system in order to be filled and emptied. For the correct setting of the head cushion, the seated person must increase or reduce the volume of the airbag by actuating corresponding valves, with the result that the front face of the head cushion is pivoted or pushed closer to the back of the seated person's head or further away from the back of the seated person's head. The possibility for adjusting the head restraint horizontally allows for the fact that, when the head restraint is raised for the purpose of adapting it to the body size of a larger driver, the horizontal distance between its head cushion and the back of the seated person's head is increased. This distance is also increased due to the fact that large drivers usually also set a greater inclination of the headrest. By virtue of the possibility for the horizontal displacement of the head cushion, this distance can be adjusted again and the head cushion brought up to the back of the seated person's head, so that it is set as well as possible in terms relevant to safety.

Investigations have shown, however, that, although many seat users adapt the seat position to their wishes by an appropriate seat adjustment, they do not set the head restraint correctly in the best possible way for their safety. In the event of an accident, therefore, physical injury, in particular injuries to the head and cervical vertebrae occur, which could have been avoided if the head restraint had been set correctly. Moreover, the known head restraint thus described has the disadvantage that, even when the head restraint is set correctly, damage, albeit considerably reduced, may occur in the region of the cervical vertebra as a result of the so-called rubber-ball effect. If the head cushion is adjusted to an extreme degree (that is, the airbag is very highly inflated), in the event of an accident, the air of the air cushion in the airbag is already compressed or is compressed excessively due to the impact of the head and, as a result, after impact accelerates the head forward again.

The object of the present invention is to improve a vehicle seat of the type mentioned in the introduction, so that when the seat is occupied by a person of any size, the head restraint is always correctly set automatically in terms relevant to safety by simple means in dependence on the seat adjustment previously carried out and, in the event of impact, constitutes reliable injury-preventing absorption protection for the seated person's head.

The adjustable vehicle seat according to the present invention has the advantage that, after the seat position has been set individually by a person using the seat, the head restraint is correctly set automatically, without the assistance of the seat user, simply by a variation in the filling quantity in a medium reservoir. The seated user is thus protected as well as possible in accident situations. At the same time, a pressure limiter connected to the medium reservoir prevents the medium reservoir from being compressed excessively during the horizontal adjustment of the head cushion, so that the medium reservoir remains sufficiently soft to cushion the impact of the head by the absorption of energy and thus to prevent the head from being thrown back. Taking into account the parameters of the seat part and back rest adjustments carried out, such as the longitudinal displacement of the seat part, the seat part inclination, the height of the seat part above the vehicle floor, the inclination of the back rest and the like, ensures that the head cushion is set correctly in terms of safety, even when the sitting posture of the seat user differs widely from the standard sitting posture envisaged in the seat design.

According to a preferred embodiment of the present invention, a motor-operated head-restraint adjuster is additionally provided, which, when activated, adjusts the height of the head cushion in relation to the top edge of the back rest according to a control signal supplied by the control unit. The control signal is determined by the control unit from the parameters of the seat part and back rest adjustments carried out. By means of this additional automatic adjustment component of the head restraint in the vertical direction, the range of adjustment of the head-restraint setting can be increased considerably and can equally embrace extremely small and extremely large seat users who may have sitting postures which differ to a great extent. Moreover, in the middle range of adjustment, the change in the filling quantity of the reservoir for adaptation to seat users having a different body size and/or sitting posture can be kept relatively small, and the adaptation time can be reduced appreciably as a result of the simultaneous execution of both the vertical and the horizontal adjusting movements of the head cushion.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of an adjustable vehicle seat with a seat part, back rest and head support for a passenger car;

FIG. 2 shows a longitudinal section through a back rest and head restraint, with a block diagram of an automatic adjusting mechanism for the head restraint;

FIG. 3 shows a front view of the head restraint in FIGS. 1 and 2;

DETAILED DESCRIPTION OF THE DRAWINGS

Figure 4:
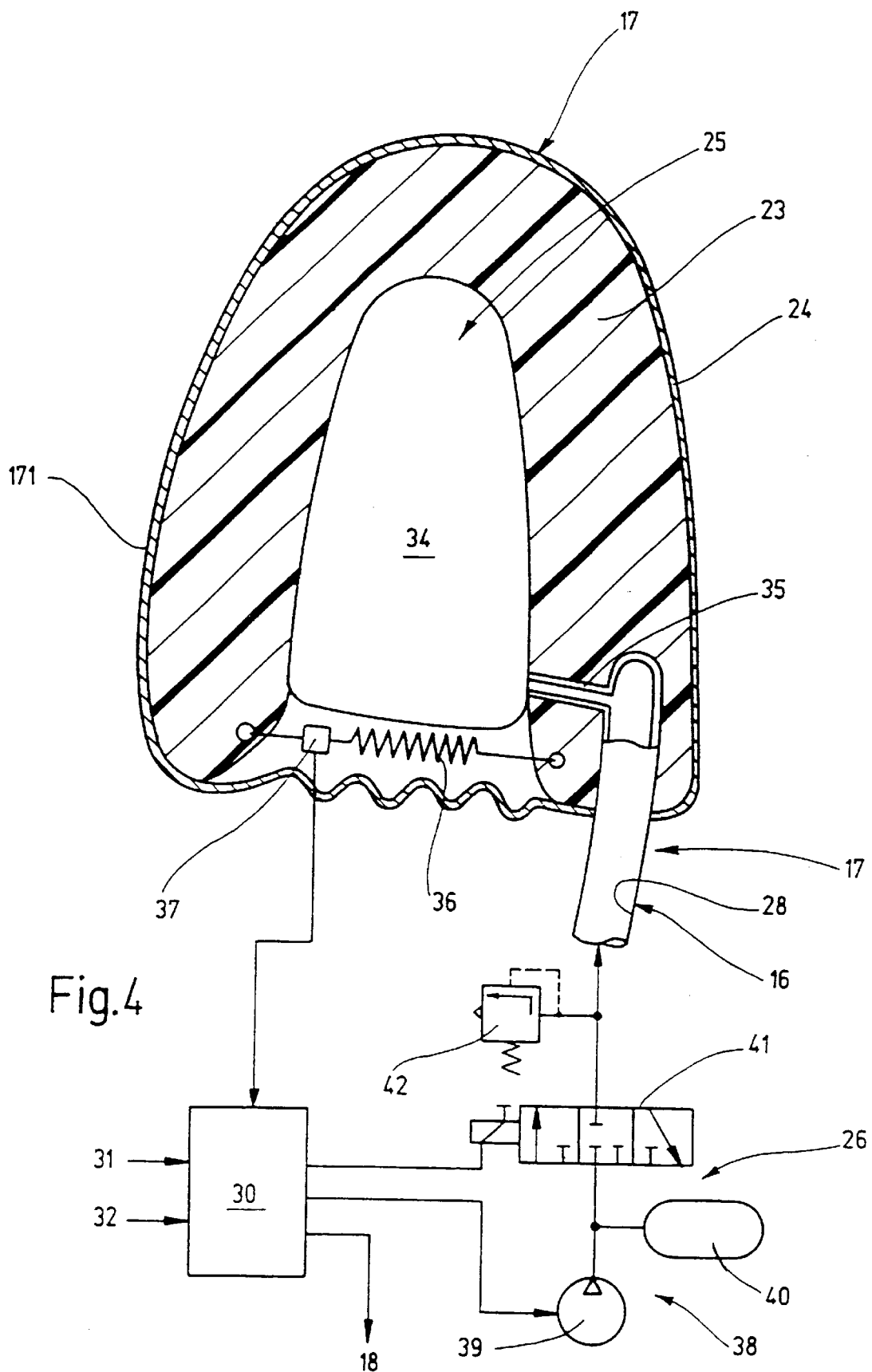
FIG. 4 shows a longitudinal section through a head restraint, with a block diagram of an automatic adjusting mechanism.

The passenger car seat illustrated in a side view in FIG. 1 and capable of being adjusted in order to adapt the seat position has a seat part 11 displaceable in the seat. longitudinal direction, a back rest 12 held on the seat part and a head restraint 13 held on the back rest 12. For the longitudinal displacement of the seat, the seat part 11 is guided so as to be longitudinally displaceable along longitudinal rails 14 fastened to the vehicle floor 10 and can be fixed non-displaceably in any set seat position by means of a locking device not illustrated here. The seat part 11 can be displaced longitudinally either by hand or by motor operation. Although not illustrated in any more detail, the seat part may also be designed so as to be adjustable in height and inclination in relation to the vehicle floor 10 and has corresponding servomotors at its disposal. The back rest 12 is arranged pivotably about a pivot axis fixed in the seat part 11 and running transversely to the longitudinal rails 14 and can be adjusted in its inclination in relation to the sitting surface of the seat part 11 by means of a handwheel 15. Instead of a handwheel 15, an electromotive inclination adjuster may also be provided. The head restraint 13 has a carrying shackle 16 which is guided so as to be longitudinally displaceable in the back rest 12 and which emerges through an orifice on the top side of the back rest 12. A head cushion 17 is fastened to the free end of the carrying shackle 16. For the vertical adjustment of the head restraint 13, a motor-operated head-restraint adjuster 18 is arranged in the back rest 12 and, in the example of FIG. 2, is designed as an electric motor 19 with a toothed gear, the output pinion 20 of which engages into a rack 21 arranged on the carrying shackle 16. The rotating output pinion 20 of the toothed gear displaces a carrying shackle 16 along a guide 22, so that the distance between the head cushion 17 and the top side of the back rest 12 increases or decreases depending on the output pinion 20.

The head cushion 17 has a foam cushion 23 which is enclosed by a cushion cover 24. The cushion cover 24 is arranged partially in folds on the underside, so that it can enclose a larger volume after the folds have been pulled out. In an further embodiment, a neck restraint (172) is also designed on the head restraint 17. The neck restraint comprises a somewhat softer material than the cushion cover 24 on the cushion front face 171 and serves to secure the cervical vertebra of the spinal column in the event of an accident, so that this part of the spinal column cannot be displaced to such a great extent in relation to the skull. Arranged inside the foam cushion 23 is a flexible medium reservoir 25 of variable volume, which is connected to a filling and discharge device 26 for a gaseous or liquid medium. The medium reservoir 25 is designed, here, as an air hose 27 and the filling and discharge device 26 as a controllable compressed-air pump 29. The air hose 27 is laid in a U-shaped manner around the free end of the carrying shackle 16 and is fixed to the shackle by means of its rear hose half 271. A compressed-air conduit 28 leads through the hollow carrying shackle 16, opens out in the air hose 27, and is connected to the compressed-air pump 29 integrated in the back rest 12. The compressed-air pump 29, like the electric motor 19, is controlled by a control unit 30 which is integrated in the back rest 12 and which is connected on the input side to two sensors 31, 32. In an embodiment, the sensor 31 detects the longitudinal displacement of the seat part 11 and the sensor 32 detects the angle of inclination of the back rest 12 in relation to the sitting surface of the seat part 11. The spatial arrangement of the sensors 31, 32 is illustrated by broken lines in FIG. 1. When the compressed-air pump 29 is switched on, it fills the air hose 27. Due to the stretching of the air hose 27, the front hose half 272 lifts off from the carrying shackle 16 and pushes the front face 171 of the head cushion 17, together with the neck restraint 172, forwards in the direction of the back of the head of the person sitting on the seat. For pressure limitation, a pressure limiter 33, indicated diagrammatically in FIG. 2, is provided in the air hose 27. For bleeding the air hose 27, a bleed valve controlled by the control unit 30 may be integrated in the compressed-air pump 29.

The control unit 30 stores a characteristic diagram, the so-called seat adjustment diagram, in which there is a predetermined relationship between parameters of the seat adjustment, for example the longitudinal displacement of the seat part and the inclination of the back rest, and the horizontal and vertical setting of the head cushion 17. In this case, the settings of the head cushion 17 are determined by (1) the displacement travel of the carrying shackle 16 in its guide 22; and (2) the filling quantity of the air hose 27. When a person takes his place on the vehicle seat, he will first adapt the seat to the desired seat position, particularly if this person is the vehicle driver. For this purpose, he will carry out at least one longitudinal displacement of the seat part and one adjustment of the back rest inclination. The longitudinal displacement of the seat part is detected by the sensor 31 and the adjustment of the back rest inclination by the sensor 32 and transmitted as electrical signals to the control unit 30. By means of these parameters, the control unit 30 reads out from the seat adjustment diagram the corresponding regulating variables for the adjusting movement of the carrying shackle 16 and the filling quantity for the air hose 27. According to these regulating variables, the electric motor 19 and the compressed-air pump 29 are switched on for a corresponding period of time, in which the displacement of the carrying shackle 16 and the filling of the air hose 27 take place. The head cushion 17 is thereby (1) adjusted in height, so that it is at the same height as the back of the seated person's head and his neck region and; (2) brought in the horizontal direction nearer to or further away from the back of the seated person's head and his neck. After the final setting, the head cushion 17 automatically assumes the position, which is the best possible in safety terms, in relation to the seated person's head, at a slight distance from the back of the head which is favourable from the point of view of an impact.

FIG. 4 illustrates another exemplary embodiment of a head restraint 17 with a filling and discharge device 26. The medium reservoir 25 is designed, here, as an airbag or air buffer 34 which is arranged in the centre of the foam cushion 23. The foam cushion 23 is firmly connected, on its rear side located behind the air buffer 34, to the carrying shackle 16 which is of hollow design and which functions as a compressed-air conduit 28. The air buffer 34 is connected to the compressed-air conduit 28 via a connection piece 35. When the air buffer 34 is filled with compressed air, it expands and pushes the front face 171 of the head cushion 17 in the direction of the back of the seated person's head. In this case, a tension spring 36 is tensioned, connecting the front part of the foam cushion 23 to the rear part of the foam cushion 23 or to the carrying shackle 16 below the air buffer 34. The cushion cover 24, once again arranged in folds on the underside of the head cushion 17, can span a substantially larger volume of the head cushion 17, so that the adjusting movement of the front part of the foam cushion 23 during the expansion of the air buffer 34 is not impeded. The amount of displacement movement of the front face 171 of the head cushion 17 during the expansion of the air buffer is detected by a displacement sensor 37 and transmitted as a feedback signal to the control unit 30. However, the displacement movement of the front face 171 of the head cushion 17 may also be detected by means of other equivalent variables, for example by means of the pressure in the air buffer 34. In this case, a pressure sensor is provided instead of the displacement sensor 37.

The filling and discharge device 26, once again designed as a pneumatic system, comprises a compressed-air source 38 consisting of a compressed-air pump 39 and compressed-air reservoir 40 and of a switching valve 41 which is connected on the input side to the compressed-air source 38 and on the output side to the compressed-air conduit 38 leading to the air buffer 34. In the embodiment of FIG. 4, the switching valve 41 is designed as a 3/3-way solenoid valve which makes it possible, in one switching position, to fill the air buffer 34 by means of the compressed-air source 38 and, in its other switching position, to bleed the air buffer 34. In the middle position, the air buffer 34 and compressed-air source 38 are shut off hermetically, so that the filling quantity in the air buffer 34 is kept constant for a relatively long period of time. Also connected to the compressed-air conduit 28 leading to the air buffer 34, is a pressure-limiting valve 42 which performs the function of the pressure limiter 33 in FIG. 2, that is to say ensures that the air pressure fed into the air buffer 34 does not exceed a predetermined value. Like the switching on and off of the compressed-air pump 39, the switching valve 41 is controlled by the control unit 30, to which the electrical output signals from the sensors 31, 32 are supplied as input signals.

The head restraint 13 is set in dependence on the seat setting in the same way as described above. If the seat is occupied by a large person, in order to adapt his seat position he will carry out a longitudinal displacement of the seat part to the rear and an setting of the back rest 12 with greater inclination. The seat-setting change detected by the sensors 31, 32 is supplied to the control unit 30 which in turn, by means of these parameters, determines from the seat adjustment diagram the necessary filling quantity for the air buffer 34 and the displacement travel for the carrying shackle 16 of the head restraint 13, so that the head restraint 13 is adapted as well as possible to the body size of the seated person. The control unit 30 then activates the motor-operated head restraint adjuster 18 for the vertical displacement of the head cushion 17 and switches the switching valve 41 into one end position for a predetermined period of time, so that air flows out of the compressed-air reservoir 40 into the air buffer 34. The air buffer 34 expands and pushes the front face 171 of the head cushion 17 nearer to the back of the seated person's head and the region of his cervical vertebra, the tension spring 36 being tensioned at the same time. When the predetermined filling quantity is reached, the control unit 30 switches off the switching valve 41 and the latter assumes its middle switching position, in which the air buffer 34 is closed off hermetically. In addition, the displacement of the front face 171 of the head cushion 17 is detected by the displacement sensor 37 and transmitted as a feedback signal to the control unit 30 which, in response to this signal, may, if appropriate, carry out a correction of the filling quantity. The head restraint 13 is thus set as well as possible for the large seat user. In the event of an accident, the seated person's head is intercepted in the correct region by the head cushion 17 and the air buffer 34 cushions the impact. If the air in the air buffer 34 is compressed excessively as a result of the impact of the head, the pressure-limiting valve 42 opens and allows air to escape into the environment. This prevents the air buffer 34 from forming a "reflection wall" at the end of its resilient range as a result of the high air compression and prevents accelerating the seated person's head forward again.

If a smaller person takes his place on the seat, after this person has adjusted the seat, the operation of adapting the head restraint 13 to the smaller person is carried out in the opposite direction. The regulating variables, read out from the seat adjustment diagram, for the longitudinal displacement of the carrying shackle 16 and for the filling of the air buffer 34 with air lead (1) to a downward displacement movement of the carrying shackle 16, over the distance between the head cushion 17 and the top edge of the back rest 12; and (2) to switching valve 41 to its bleeding position, so that the air buffer 34 is connected to the environment. Under the spring force of the tensioned tension spring 36, the air buffer 34 is compressed, the air flowing out via the switching valve 41, until the predetermined filling quantity is reached. Thereafter, both the motor-operated head restraint adjuster 18 and the switching valve 41 are switched off, with the result that the latter assumes its shut-off position, illustrated in FIG. 4, and closes off the filling quantity in the air buffer 34 hermetically.

Figure 5:
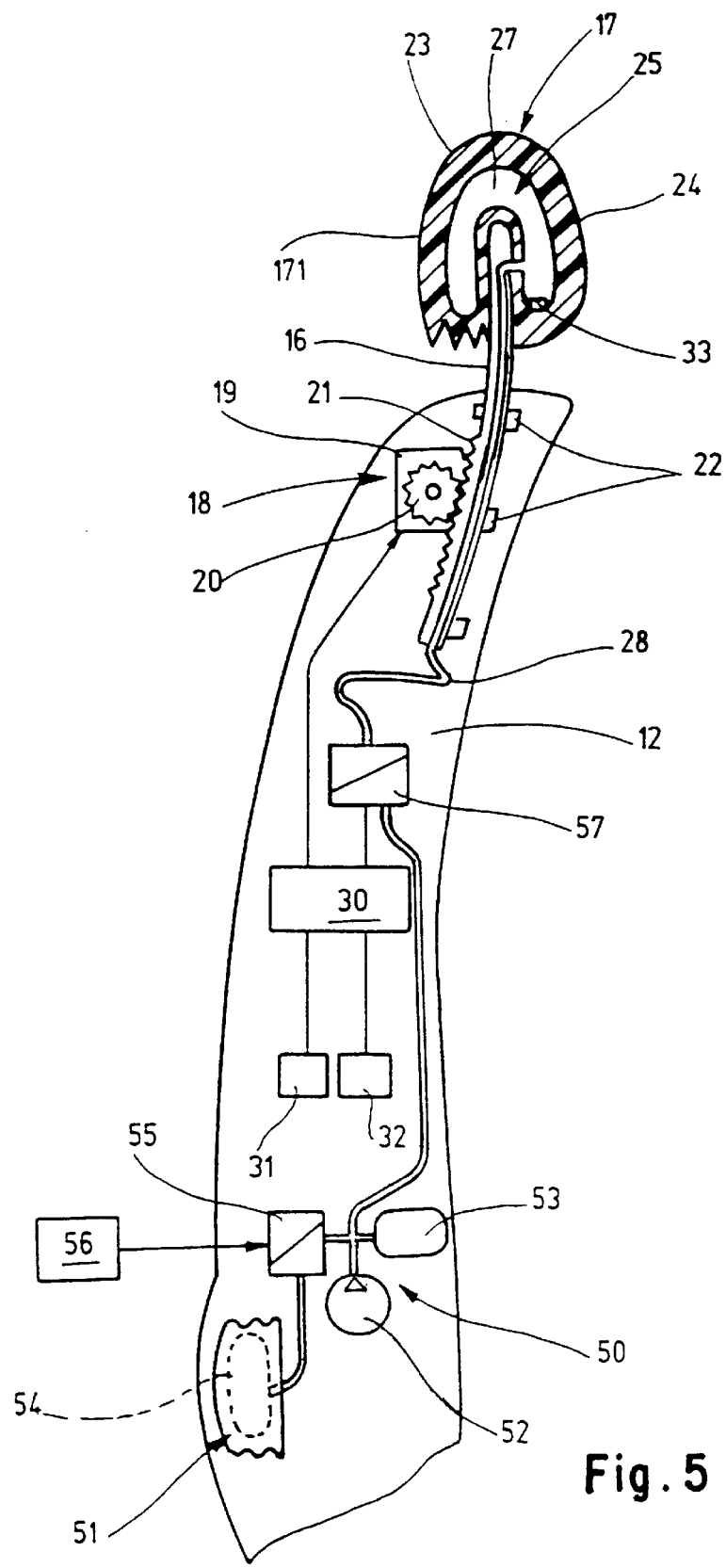
FIG. 5 shows the same illustration as in FIG. 2, with a modified automatic adjusting mechanism.

FIG. 5 illustrates another embodiment of a head restraint 17, in which a separate filling and discharge device for the medium reservoir 25 designed as an air hose 27 has been dispensed with and use is made, instead, of a pneumatic system 50, already present in the vehicle seat, for a pneumatically adjustable lower-back support 51 integrated in the back rest 12. The pneumatic system 50 comprises a compressed-air source 52 and a compressed-air reservoir 53 for one or more air buffers 54, for example lower-back support and side cheeks. A valve 55, which is responsible for filling the air buffer 54, is activated by a control unit 56. The air hose 27 of the head restraint 17 is connected to the compressed-air source 52 and the compressed-air reservoir 53 via a valve 57 and is activated by the control unit 30 in order to predetermine the air quantity. The seat illustrated in FIG. 5 otherwise corresponds to the seat according to FIG. 2 so that the same parts are provided with the same reference symbols.

The present invention is not restricted to the embodiments described above. Thus, further parameters for existing possibilities for adjusting the seat part and back rest, for example seat-part inclination, height of the seat part above the vehicle floor and the like, may be stored in the seat adjustment diagram and also taken into account during the adjustment of the seat. Instead of a seat adjustment diagram, a computing program may also be provided, into which the sensor-detected parameters of the various seat settings are entered. Instead of one air hose 27 or one air buffer 34, a plurality may also be provided, or the air hose 27 and air buffer 34 may be subdivided into a plurality of cells.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat for motor vehicles, comprising:
   a seat part;
   a back rest connected to the seat part;
   a head restraint connected to the back rest comprising a head cushion and a flexible reservoir having a variable volume;
   a filling and discharge device operatively connected to the variable volume; and
   a control unit comprising a stored diagram related to positions of the seat part and back rest and a horizontal displacement of the head restraint;
   wherein the horizontal displacement of the head restraint is adjustable according to the diagram, thereby shifting a front face of the head cushion forwards as a result of an increase in the variable volume of the reservoir or backwards as a result of a reduction in the variable volume of the reservoir so that the head cushion is always at a distance from a seat user's head.

2. A vehicle seat according to claim 1, wherein the seat part is displaceable in at least one of a vertical direction and a direction of inclination by a servomotor.

3. A vehicle seat according to claim 1, wherein the control unit determines a height of the head restraint by adjustments to the seat part and back rest and transmits a corresponding control signal to a motor-operated head restraint adjuster.

4. A vehicle seat according to claim 1, further comprising a neck restraint on the cushion front face.

5. A vehicle seat according to claim 1, wherein said seat part is displaceable at least in a longitudinal direction along a plurality of rails.

6. A vehicle seat according to claim 1, wherein an inclination of the back rest is adjustable relative to the seat part by an adjuster selected from the group consisting of a handwheel and an electromotive inclination adjuster.

7. A vehicle seat according to claim 1, wherein the head restraint further comprises a pressure limiter that controls outflow from the reservoir at a predetermined pressure.

8. A vehicle seat according to claim 7, wherein the predetermined pressure is due to restraining of the seat user's head due to an impact.

9. A vehicle seat according to claim 1, wherein the control unit determines the variable volume of the reservoir by adjustments to the seat part and the back rest and transmits a corresponding control signal to the filling and discharge device.

10. A vehicle seat according to claim 9, wherein sensors supply the adjustments of the seat part and back rest to the control unit.

11. A vehicle seat according claim 1, wherein the head cushion further comprises return means that are tensioned during an increase in the variable volume of the reservoir and that exert a return force during a decrease in the variable volume of the reservoir.

12. A vehicle seat according to claim 11, wherein the return means are spring elements.

13. A vehicle seat according to claim 1, wherein the head cushion further comprises a sensor that detects movement of the cushion front face during a change in the variable volume of the reservoir and outputs a signal to the control unit.

14. A vehicle seat according to claim 13, wherein the sensor is selected from the group consisting of a pressure sensor and a displacement sensor.

15. A vehicle seat according to claim 1, wherein the reservoir comprises at least one of an air hose and an air buffer; and
   the filling and discharge device comprises a pneumatic system feeding lower-back support in the back rest.

16. A vehicle seat according to claim 1, wherein at least one air hose or at least one air buffer is connected to the pneumatic system via a valve controlled by the control unit.

17. A vehicle seat according to claim 1, wherein the reservoir comprises at least one of an air hose and an air buffer; and
   the filling and discharge device comprises a pneumatic system comprising at least one compressed-air source.

18. A vehicle seat according to claim 17, further comprising a pressure-limiting valve connecting a conduit of an air buffer and the pneumatic system.

19. A vehicle seat according to claim 17, wherein the compressed-air source comprises a compressed-air pump and a compressed-air reservoir.

20. A vehicle seat according to claim 17, wherein the pneumatic system further comprises a switching valve connected on an input side to the compressed-air source and on an output side to the conduit.

21. A vehicle seat according to claim 20, wherein the switching valve is a 3/3-way solenoid valve.

22. A vehicle seat for motor vehicles, comprising:
   means for displacing a seat part at least in a longitudinal direction;
   means for adjusting a back rest connected to the seat part, wherein inclination of the back rest is adjustable relative to the seat part;
   a head restraint connected to the back rest comprising a head cushion and a flexible reservoir having a variable volume;
   a filling and discharge device operatively connected to the variable volume;
   means for adjusting the height of the head restraint; and
   means for adjusting the horizontal displacement of the head restraint, so that a front face of the head cushion shifts forward as a result of an increase in the variable volume of the reservoir or shifts backward as a result of a reduction in the variable volume of the reservoir.

* * * * *